United States Patent [19]

Bestenreiner et al.

[11] 4,030,106

[45] June 14, 1977

[54] METHOD AND ARRANGEMENT FOR ELIMINATING UNDESIRED DENSITY VARIATIONS IN ELECTROSTATICALLY CREATED COPIES OF AN ORIGINAL

[75] Inventors: Friedrich Bestenreiner, Grunwald; Josef Helburger; Wolfgang Ruf, both of Munich, all of Germany

[73] Assignee: AGFA-Gevaert, A.G., Leverkusen, Germany

[22] Filed: Sept. 22, 1975

[21] Appl. No.: 615,795

[30] Foreign Application Priority Data

Sept. 24, 1974 Germany .................. 2445543

[52] U.S. Cl. .................. 346/153; 346/154
[51] Int. Cl.² .................. G03G 15/044
[58] Field of Search .......... 346/153, 154, 165, 162, 346/163 SB; 178/6.6 A

[56] References Cited

UNITED STATES PATENTS

| | | | |
|---|---|---|---|
| 2,868,642 | 1/1959 | Hayford | 346/74 ES |
| 2,922,106 | 1/1960 | Oates | 360/25 |
| 3,217,111 | 11/1965 | Namenyi-Katz | 360/25 |
| 3,480,963 | 11/1969 | Stowell | 346/74 EE |
| 3,598,910 | 8/1971 | Johnston | 178/6.6 A |
| 3,792,495 | 2/1974 | Bliss et al. | 346/74 EE |

*Primary Examiner*—Jay P. Lucas
*Attorney, Agent, or Firm*—Michael J. Striker

[57] ABSTRACT

An electric charge is created on a moving reproduction carrier by each of a plurality of electrodes extending in a line perpendicular to the direction of transport of the reproduction carrier. Each of the signals applied to the electrodes has an amplitude corresponding to the density of the corresponding point of the original. The charge created by the electrode has undesirable variations resulting from differences in the electrode characteristics and from differences in the amplifiers amplifying the signal before application to each electrode. After each charge distribution from a copy has been created, a test signal is supplied to the inputs of all amplifiers. This creates a test charge distribution on the reproduction carrier. After developing of the reproduction carrier the test line created by developing of the test charge distribution is scanned photoelectrically. A differential amplifier compares each of the so-scanned signals with a reference signal and furnishes an error signal as a function of the difference therebetween. The error signal is utilized to vary the gain of the amplifier associated with the electrode.

11 Claims, 4 Drawing Figures

METHOD AND ARRANGEMENT FOR ELIMINATING UNDESIRED DENSITY VARIATIONS IN ELECTROSTATICALLY CREATED COPIES OF AN ORIGINAL

BACKGROUND OF THE INVENTION

This invention relates to a method and arrangement for creating copies of an original. Specifically it relates to such arrangements wherein the original is scanned point by point along a plurality of lines and a charge distribution is created on a continuously moving reproduction carried by means of an electrostatic system which comprises a plurality of electrodes extending in a line perpendicular to the direction of motion of the reproduction carrier. The so-created charge is then developed at a developing station in order to create the desired copy of the original. In known arrangement of this type, including laser beam recordings and electron beam recordings as well as electronic recording tubs such as fiber tubes, pin tubes, etc., the signal to be applied to the electrodes is derived from a so-called flying spot scanning of the original. In such arrangements all the signals are processed by a single processing means per color channel in order to make gradation corrections, effect contour enhancement, etc. In such arrangements the voltage applied to the electrodes for each picture element is available only for the time during which the corresponding picture element in the original is being scanned. However, for electrostatic recording systems it is desirable that such signals be available at least for the time required for scanning a complete line. Further, in such systems the charge density created on the reproduction carrier has undesired variations resulting both from the differences in the operating characteristics of the different electrodes and from differences in the signal levels and gains of the amplifiers supplying each of the electrodes.

SUMMARY OF THE INVENTION

It is an object of the present invention to furnish a system wherein a flying spot scanning can be used without the above-mentioned disadvantages.

In accordance with the present invention, a method and arrangement is furnished which causes the signals resulting from the scanning of the original to be stored individually and then to be applied for a time substantially equal to the time necessary for scanning a line of the original to the electrode constituting the electrostatically recording system. The signals resulting from the scanning of the original are all processed by a single processing circuit for purposes such as gradation control, contour enhancement, etc. The stored signals are then applied to each of the electrodes for a time corresponding to the time required for scanning a complete line of the original.

Differences in the luminance of the lines constituting the copy of the original are eliminated by compensation circuits. Specifically, the recording of a charge distribution for each copy of an original is followed by the recording of a test line, that is a test signal is substituted for the processed scanning signals derived from the original. An error signal for each electrode is then derived either by comparing the signal applied to the electrode to a reference signal and furnishing an error signal corresponding to the difference threrebetween, or by developing the test charge distribution, scanning the resulting test line and comparing the amplitudes of the so-canned signals to a reference signal. The error signal created in either way is utilized to vary the gain of the amplifier associated with the particular electrode in such a manner as to reduce the error signal to zero. The error signal is of course maintained for the duration of the creation of the charge distribution for the copy of the next original.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A preferred embodiment of the present invention will now be described with reference to the drawing.

Figure 1:
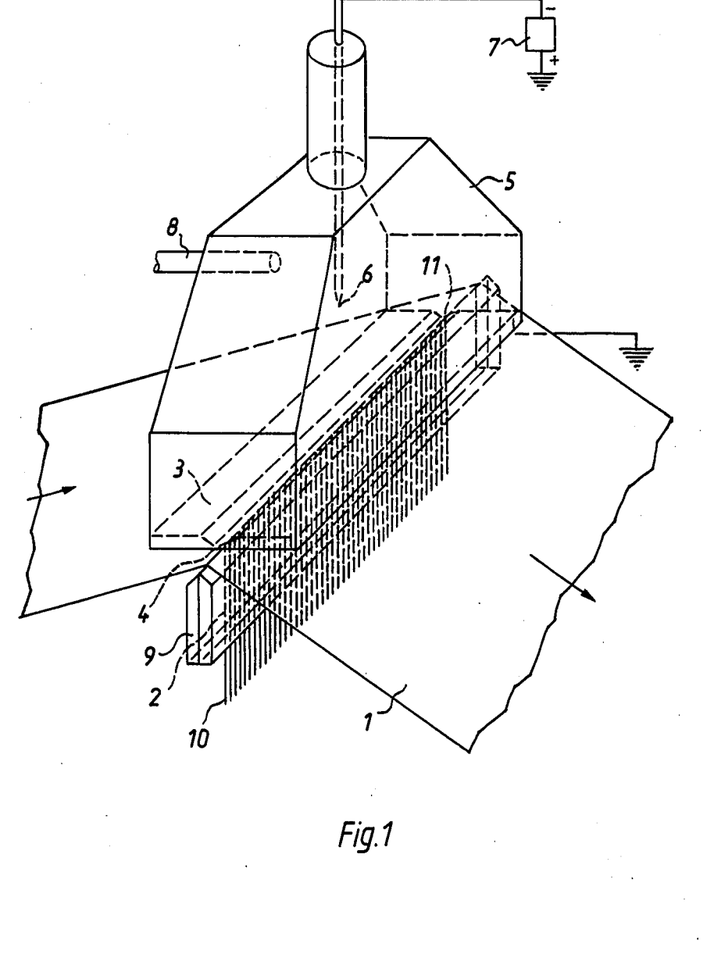
FIG. 1 shows an electrostatic recording system including a plurality of electrodes.

FIG. 1 shows an electrostatic recording system with a plurality of electrodes. Specifically, a reproduction carrier 1 is stretched over the edge 11 of an insulating casing 9 which comprises a plurality of electrodes 10. The electrodes 10 comprise mutually insulated wires which are arranged in a row at a density of ten wires per millimeter in a preferred embodiment of the present invention. The material for the casing is glass. Positioned directly over edge 11 is a mask 3 having a slit 4. The mask is made of electrically conductive material and forms the bottom surface of a housing 5 which is made of insulating material. A point electrode 6 is inserted into the housing 5. The electrode is connected to a direct current source 7.

In operation, the reproduction carrier is transported in the direction of the arrow with uniform speed and nitrogen is blown through an opening 8 into the housing 5. The amount of nitrogen is sufficient to cause all air to be evacuated through slit 4 and to prevent the return diffusion of air through this slit. The space in which the discharge takes place, that is the space in which the point electrode is present as well as the actual recording zone between slit 4 and the reproduction carrier is filled with nitrogen. The discharge current of a corona discharge is, as is well known, substantially higher in an atmosphere of nitrogen or another inert gas than it is in air under the same conditions.

A corona discharge is created at the electrode 6 by applying 20 or 30 kv volts to this electrode. The resulting discharge current flows in the main between electrode 6 as cathode and mask 3 as anode. The part of the corona discharge current can be diverted to elements 10 by applying a positive voltage to these elements. This discharge current can then be used to charge the film (reproduction carrier).

Electrodes 10 are energized individually. As mentioned above, it is desirable that the voltages be applied to the electrodes for a relatively long time, which eliminates the possibility that the electrodes be energized in synchronism with the scanning of the original.

Therefore, in accordance with the present invention, the signal derived from scanning the originals is, after processing, stored in a sample and hold circuit and the entry of signals into this storage as well as the output from the storage to the electrodes is controlled by digital elements. For this type of circuit experience has shown that it is not necessary that the switching of the stored values from one line to the next must take place simultaneously for all storage elements. It is possible that the change of values in the individual storage elements takes place in sequence, and preferably in the same time sequence as the scanning of the corresponding points of the original. The voltage which corresponds to a particular point in a particular line of the original is then applied to the corresponding electrode until the value derived from the corresponding point in the next line is stored in the storage element.

Figure 2:
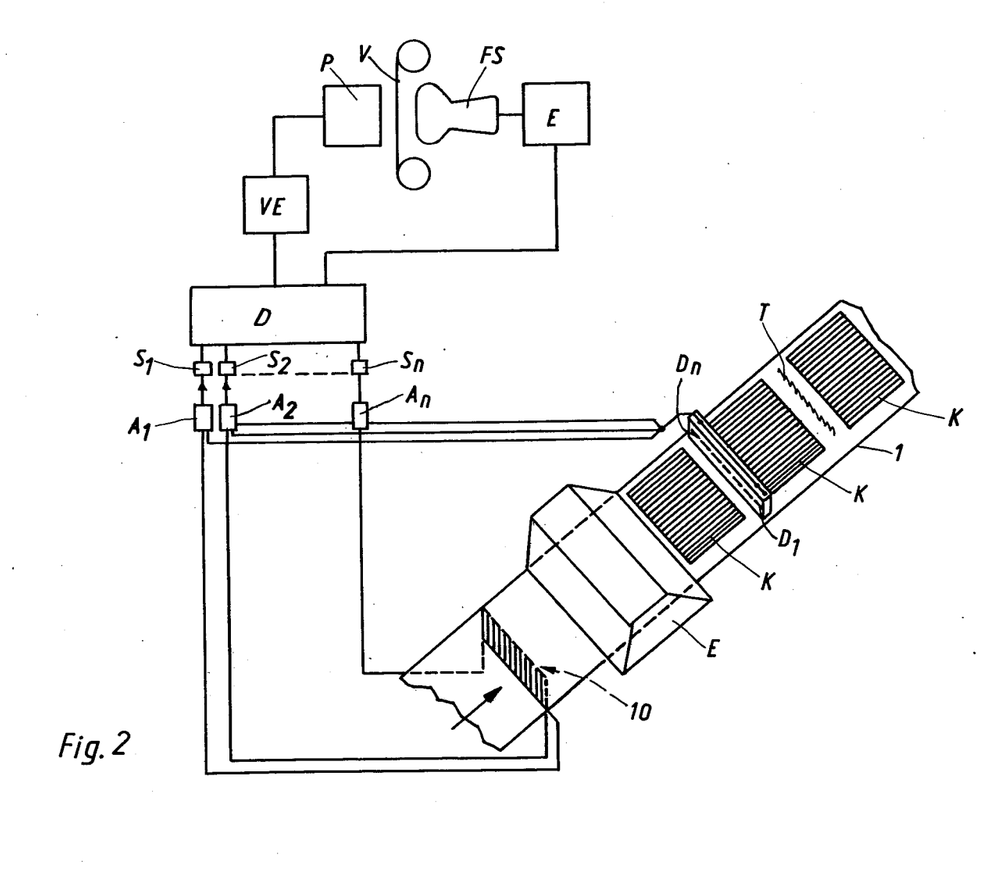
FIG. 2 is a schematic diagram showing the overall copying arrangement of the present invention.

FIG. 2 shows a block diagram of the apparatus in accordance with the present invention. A beam scanning tube FS scans an original V by means of a light beam which is controlled by electronic circuitry denoted by the letter EC. The light modulated by the original V is changed into an electrical signal by means of a photoelectrical transducing element P. This signal comprises a sequence of voltages having different amplitudes, each corresponding to the density of the picture element then scanned. During the retrace interval, that is during the time that the light beam returns from the end of the line to the beginning of the next line, this signal sequence is of course interrupted.

The above-described analog signal is first processed in a processing circuit VE for purposes of gradation control, contour enhancement, etc. A distributing circuit D is then used to apply these signals to the input of storage elements $S_1, S_2 \ldots S_n$, the number of which corresponds to the number of electrodes 10. The storage and distributor arrangements will be explained in greater detail with reference to FIG. 3.

An amplifier $A_1 \ldots A_n$ is arranged after each storage element $S_1 \ldots S_n$. It is a function of these amplifiers to supply the necessary amplification of the signal prior to its application to the corresponding electrode. Electrodes 10 then record a charge distribution on the reproduction carrier 1 which, as previously mentioned, is continuously transported in the direction of the arrow. The charge distribution is then developed in a developing station E so that a copy K of the original V results. Tolerances in the building blocks employed in the various channels can lead to differences among the channels which in turn result in undesired strips in the copies. For this reason, after the charging for each copy K has been completed, a test line T is created by using a standard test signal instead of the process signals derived from scanning the original. It should be noted here that the signals applied to the electrodes during the reproduction of the original V are herein referred to as individually amplified process signals, while the signals applied to the electrodes when using a test signal (see also FIG. 4) are referred to as individually amplified test signals. The test line T which is created by developing the reproduction carrier at a developing station E is scanned photoelectrically. This, in a preferred embodiment of the present invention, is accomplished by a line of diodes $D_1 \ldots D_n$. Since this line was created by a single test signal any variations in its density are of course due to errors in the amplification or to differences in the operating characteristics of the electrodes. In order to compensate for these differences an error signal is derived corresponding to the difference between the amplitude of the scanned signal and the reference signal and each individual error signal is applied to the corresponding one of the amplifiers $A_1 \ldots A_n$ in order to change the gain thereof in such a direction as to cause the error signal to become zero.

In an alternate embodiment of the present invention the error signal is derived by comparing the output voltages of the amplifiers following the substitution of the test signal for the processed scanning signals. This has the advantage of saving the photoelectric scanning of the copy but has the disadvantage that differences in the characteristics of the recording electrodes are not compensated for. Further of course any errors in the developing station E can also not be compensated by this method or arrangement.

Figure 3:
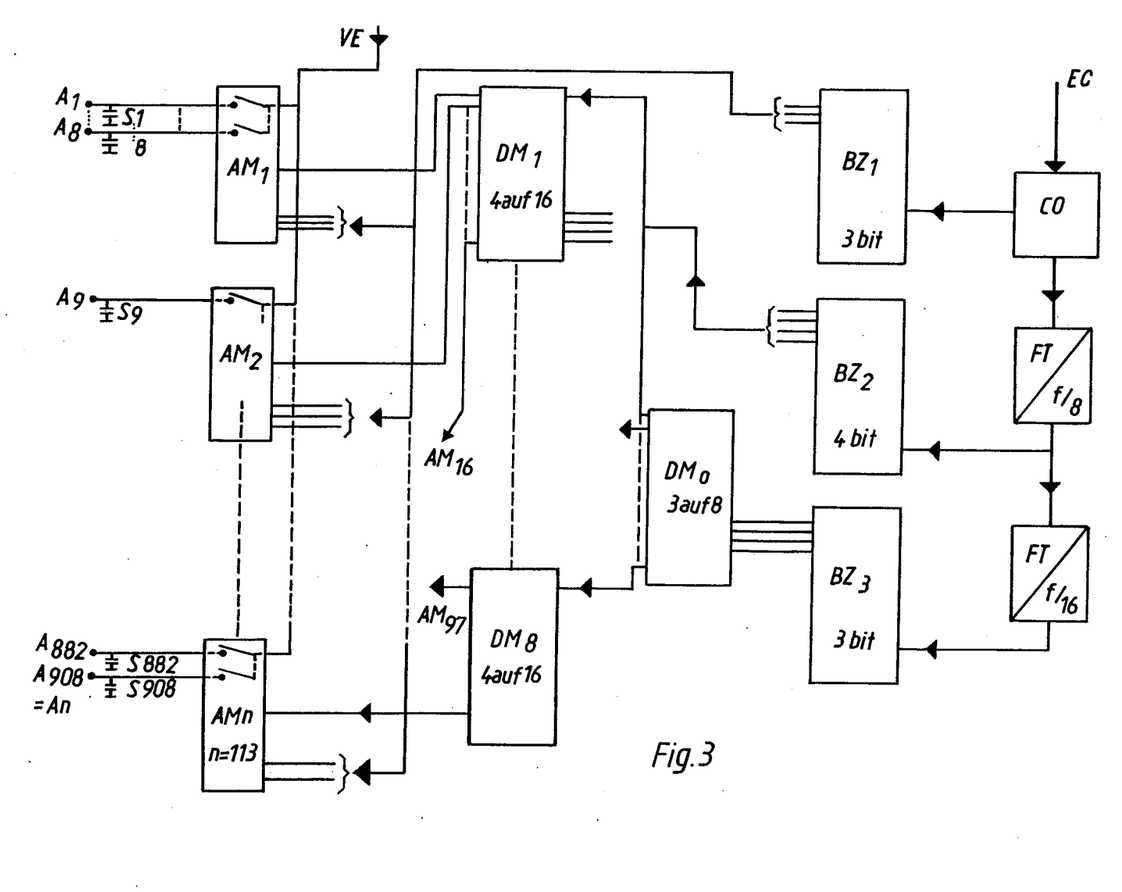
FIG. 3 is a block diagram of a distributor system for analog storages for approximately 900 picture elements.

FIG. 3 shows a block diagram of the distributor circuit D and the storage elements $S_1 \ldots S_n$ for a circuit containing approximately 900 picture elements, that is 900 electrodes and storage elements. The signals furnished by the photoelectric transducer P and processed in the electronic circuitry VE are applied in parallel to a chain of analog multiplexers $AM_N$. If, for example, each of these multiplexers has eight channels, 113 such multiplexers are furnished. Each of the analog multiplexers $AM_1 \ldots AM_N$ is controlled by a clock pulse derived from the line drive pulse of the scanning electronics E and opens a gate to one of the storage capacitors $S_1 \ldots S_n$ for the duration of time required for scanning the particular picture element. For this purpose, a clock oscillator CO is furnished which furnishes 900 oscillations during the time required for scanning one line. This frequency is divided by a frequency divider FT first by a factor of 8 and then by a factor of 16. The subdivided frequencies control a set of binary counters $BZ_1$, $BZ_2$, $BZ_3$. The ouputs of the first binary counter $BZ_1$ are directly applied to analog multiplexes $AM_1 \ldots AM_n$. The output of the second binary counter $BZ_2$ are connected to a series of eight decoders $DM_1 \ldots DM_8$ which decode the four signals applied at their inputs to 16 signals, that is one of sixteen lines at the output of the decoder is energized in response to each signal combination at the input. The 16 outputs of each of the decoders is applied to sixteen of the analog multiplexers $AM_1 \ldots AM_{16}$, $AM_{17} \ldots AM_{32}$, etc. The third binary counter $BZ_3$ then controls a decoder $DM_0$ which converts the signal conditions in three input lines to a sequence of eight outputs. These eight outputs are connected to the eight decoders $DM_1 \ldots DM_8$.

The above arrangement allows each of the 900 storage capacitors $S_1 \ldots S_n$ to be supplied in turn by the signals created by scanning of the corresponding points in the original.

Each of the storage capacitors $S_1 \ldots S_n$ is connected with a corresponding output amplifier $A_1 \ldots A_n$. The output voltage of these amplifiers is the signal for driving the electrode and varies between approximately zero volts and 300 volts. The particular constructions of these amplifiers is not a subject of the present invention. However the voltage applied to the electrodes 10 must fulfill the following requirements:

a. The amplitude must be sufficiently high, (i.e., the gain of the amplifiers must be sufficiently high).

b. The cross coupling between adjacent electrodes, particularly at the leading and trailing edges of the applied pulses must be sufficiently small with respect to amplitude and/or time that the undesired voltages are not recorded.

c. The galvanic coupling between adjacent electrodes must be sufficiently small.

d. The transition period from one line to the next must be sufficiently short that no trace of same appears in the reproduction.

e. The signal levels must be maintained to a sufficient extent that no stripes appear in the reproduction even for surfaces having a uniform coloring of the same luminance.

The present invention is particularly concerned with the requirement mentioned in paragraph e) above. The requirement set forth in the above paragraphs a)–d) are met in known arrangements.

As mentioned above, the requirement set forth in paragraph e) above is not easily met because of different operating characteristics of the individual electrodes and because of tolerances in the building elements of the amplifiers. It is thus desirable to furnish additional control circuits for regulating both the output level and the amplification factor of the amplifiers. Preferably, the regulation takes place in the space between sequential reproductions, the space being required in any case for returning the flying spot scanner to its initial position.

For this purpose a test signal is used which is recorded during the vertical retrace time of the flying spot scanner similarly as are test signals in television. The test signal has a value which remains constant at least over the duration of a line interval. The desired values resulting at the output of the amplifier in response to such a test signal as well as the density of the recorded test line on the reproduction carrier as a result of this test signal are of course known. If a number of parameters are to be adjusted, as for example the output level and the amplification prior to application of the signal to the electrode, a different test line can be created on the reproduction carrier for each of these parameters. However, a preferred embodiment of the present invention in which both the output level of the amplifiers and the gain or amplification factor are determined from the results of a single test line will be shown with reference to FIG. 4.

In general, the error signal for adjusting the amplitude and/or the output level of the amplifiers can take place in two ways. In the first, the voltage, the current or another equivalent parameter at the output of the amplifier can be measured and compared to the desired value of the signal which should result from the application of the test signal. In this case of course the regulation is concerned only with correcting errors in the electronic portion. In the second case the density of the line created by the electrodes on the reproduction carrier is scanned by means of an electronic transducer. When this value is compared to the desired value which should have been created in response to the test signal, the characteristic of the electrodes is of course also taken into consideration.

The comparison of the desired and actual values of course results in an error signal which is stored until the next testing process, that is at least for the duration of the creation of the subsequent copy of reproduction of the original.

Figure 4:
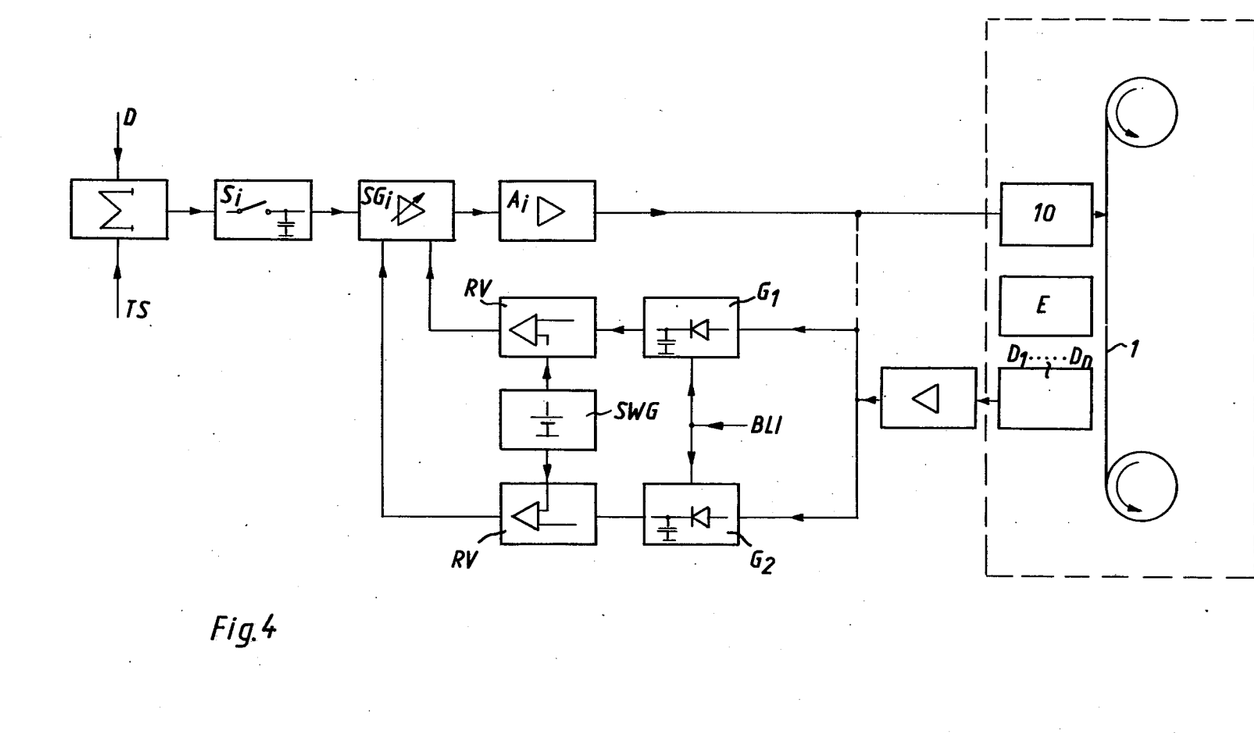
FIG. 4 is a block diagram of the correction arrangement in accordance with the present invention.

A preferred embodiment of such a correction arrangement is shown in FIG. 4.

The signal supplied by the distributor D which is of course basically derived from the flying spot scanner FS is stored in a capacitor $S_i$ for the duration of a single line. A regulating element, here a variable gain amplifier $SG_i$ is connected to the output of the capacitor. The output of the variable gain amplifier is connected to the input of the amplifier $A_i$ whose output in turn is connected to the particular one of the electrodes 10 associated therewith. It should be noted that the combination of the variable gain amplifier $SG_i$ and amplifier $A_i$ is herein referred to as amplifier means. During the vertical retrace interval of the flying spot the test signal TS is applied to the storage capacitor. In a preferred embodiment of the present invention the test signal TS comprises a DC voltage level and a sinusoidal voltage of known amplitude superimposed on this DC level. The application of this test signal causes a voltage to appear at the output of amplifier $A_i$ whose desired value both as to DC level and AC amplitude are of course known. These values are stored in a means for furnishing a reference signal, namely storage SWG. Since it is very simple to separate a DC signal from an AC signal, the two desired values can be introduced simultaneously in the same test line and individual corrections can still be carried out. For this purpose two separate feedback paths are provided. Control rectifiers $G_1$ and $G_2$ serve as gates and storages for the actual values of DC and AC voltage respectively. The controlled rectifiers $G_1$ and $G_2$ are activated by the vertical blanking pulse $BL_t$. The comparison between the desired and actual values is then carried out in comparators RV which, in a preferred embodiment of the present invention, are differential amplifiers. The dash lines in the drawing indicate the connection which is made if the regulation is carried out as a function of the output voltages of the amplifiers only. If the characteristics of the electrodes are to be included in the regulation the dashed connection is broken and the actual values which are to be compared with the reference values are derived from scanning of the test line on the reproduction carrier. The scanning is carried out by means of photoelectric transducers $D_1 \ldots D_n$. These diodes are of course arranged in a line perpendicular to the direction of transport of the reproduction carrier. Alternatively, the whole line may be scanned by a single photoelectric transducer. Either the transducer itself is moved in a direction perpendicular to the reproduction carrier under this circumstance, or the different portions of a line are reflected sequentially onto the transducer.

Many embodiments of the actual regulating circuit are possible. Thus it is possible that, instead of the storage of the actual value which is carried out by the capacitors associated with rectifiers $G_1$ and $G_2$ in FIG. 4, the correction signals itself are stored, the required storages forming part of the variable gain amplifier.

It is seen that the present invention comprises a simple and relatively inexpensive method and arrangement for correcting the charge distribution created at the various points of the reproduction carrier in such a manner that this charge distribution is substantially independent of the characteristics of both the amplifiers and the recording electrodes used in the system.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method of forming on a travelling recording medium an image of an original to be copied, wherein the original is scanned line-by-line and the scanning signals corresponding to one line are routed to respective ones of a plurality of recording channels, each recording channel being comprised of a writing electrode and a signal transmission channel leading to the writing electrode, the writing electrodes being disposed in a row extending transverse to the recording medium travel direction, the recording channels undesirably having non-identical characteristics tending to produce images containing perceivable stripes extending in the recording medium travel direction, a method of equalizing the operation of the recording channels so that such stripes will not appear, the equalizing method comprising the steps of applying identical test signals to the recording channels, using detector means to generate a plurality of error signals corresponding in a number to the recording channels and indicative of the lack of equality in the operation of the recording channels, in response to the application of the test signals, associating with the transmission channels a corresponding plurality of adjusting stages each operable for adjusting the transmission characteristic of the respective transmission channel, appplying the plurality of error signals to the plurality of adjusting stages to cause the latter to effect automatic errorsignal-dependent adjustments in the transmission characteristics of the transmission channels to equalize the operation of the plurality of recording channels and prevent the formation of such stripes.

2. In a method as defined in claim 1, producing from a succession of originals to be copied a corresponding succession of images on the travelling recording medium, performing said equalizing method subsequent to the production of each image and prior to the production of the next image.

3. In a method as defined in claim 1, the step of associating a plurality of adjusting stages with the plurality of transmission channels comprising providing the plurality of transmission channels with a corresponding plurality of adjustable-gain amplifiers and with a corresponding plurality of gain-adjustment stages constituting said adjusting stages, the plurality of error signals indicative of the lack of equality in the operation of the recording channels being applied to the plurality of gain-adjustment stages to effect automatic error-signal-dependent adjustments in the gains of the plurality of adjustable-gain amplifiers.

4. In a method as defined in claim 1, the step of generating the error signals comprising using the detector means to sense the plurality of output signals appearing at the outputs of the plurality of transmission channels in response to the application of the test signals thereto, using comparing means to compare the plurality of transmission channel output signals against reference signals and in dependence upon the comparison generating the plurality of error signals indicative of the lack of equality in the operation of the recording channels.

5. In a method as defined in claim 1, the step of generating the error signals comprising causing the row of writing electrodes to produce a line image on the recording medium in response to the application of the test signals to the recording channels, electrooptically detecting the equality of the portions of the line image produced by the plurality of writing electrodes by generating a plurality of photoelectric signals corresponding to such portions, using comparing means to compare the plurality of photoelectric signals against reference signals and in dependence upon the comparisons generating the plurality of error signals indicative of the lack of equality in the operation of the recording channels.

6. In a copying apparatus of the type including means for transporting a recording medium in a predetermined direction, means for effecting line-by-line scanning of an original to be copied and generating corresponding scanning signals, a plurality of recording channels each comprised of a writing electrode and a signal transmission channel leading to the writing electrode, the writing electrodes being disposed in a row extending transverse to the recording medium travel direction, means for routing the scanning signals corresponding to one scanned line to respective ones of the plurality of recording channels to cause the writing electrodes to produce on the recording medium a line image corresponding to the line scanned on the original, the recording channels undesirably having non-identical characteristics tending to produce images containing perceivable stripes extending in the recording medium travel direction, an arrangement for equalizing the operation of the recording channels so that such stripes will not appear, the equalizing arrangement comprising, in combination, means operative when activated for automatically applying identical test signals to the recording channels; detector means operative for automatically generating a plurality of error signals corresponding in a number to the recording channels and indicative of the lack of equality in the operation of the recording channels in response to the application of the test signals, a plurality of adjusting means corresponding in number to the transmission channels and operative for receiving the respective error signals and effecting automatic error-signal-dependent adjustments in the transmission characteristics of the respective transmission channels to equalize the operation of the plurality of recording channels and prevent the formation of such stripes.

7. In a copying apparatus as defined in claim 6, the copying apparatus being operative for producing form a succession of originals to be copied a corresponding succession of images on the travelling recording medium, the equalizing arrangement including means for causing the test signal applying means, the detector means and the adjusting means to effect an equalizing operation subsequent to the production of each image and prior to the production of the next image.

8. In a copying apparatus as defined in claim 6, each transmission channel including a respective one of a plurality of adjustable-gain amplifiers, the plurality of adjusting means comprising a plurality of means each operative for receiving a respective one of the error signals and automatically effecting an error-signal-dependent adjustment of the gain of the adjustable-gain amplifier of the respective transmission channel.

9. In a copying apparatus as defined in claim 6, the detector means comprising a plurality of detectors each operative for comparing the output signal appearing at the output of a respective one of the transmission channels against a predetermined reference signal and in dependence upon the result of the comparison generating a corresponding error signal.

10. In a copying apparatus as defined in claim 6, the test signal applying means comprising means for applying the test signals to the recording channels and causing the row of writing electrodes to produce in response thereto a corresponding line image on the recording medium, the detector means comprising photoelectric means operative for detecting the equality of the portions of the line image produced by the plurality of writing electrodes and generating a plurality of photoelectric signals corresponding to such portions, comparing means operative for compariing the photoelectric signals against reference signals and in dependence upon the comparisons generating the plurality of error signals indicative of the lack of equality in the operation of the recording channels.

11. In a copying apparatus as defined in claim 10, the photoelectric detector means comprising a plurality of photoelectric detectors each operative for generating a respective photoelectric signal corresponding to the portion of the line image produced by a respective one of the writing electrodes, the comparing means comprising a plurality of comparators each operative for comparing a respective one of the photoelectric signals against a reference signal and generating a corresponding one of the plurality of error signals.

* * * * *

UNITED STATES PATENT AND TRADEMARK OFFICE
CERTIFICATE OF CORRECTION

PATENT NO. : 4,030,106
DATED : June 14, 1977
INVENTOR(S) : Friedrich Bestenreiner et al.

It is certified that error appears in the above-identified patent and that said Letters Patent are hereby corrected as shown below:

In the heading [75], the name of the second inventor should read -- Josef Helmberger --.

Signed and Sealed this

Twentieth Day of December 1977

[SEAL]

Attest:

RUTH C. MASON
Attesting Officer

LUTRELLE F. PARKER
Acting Commissioner of Patents and Trademarks